US010433131B2

(12) United States Patent
Yang et al.

(10) Patent No.: US 10,433,131 B2
(45) Date of Patent: Oct. 1, 2019

(54) EMBEDDED UNIVERSAL INTEGRATED CIRCUIT CARD (EUICC) COMMAND PROCESSING

(71) Applicant: Apple Inc., Cupertino, CA (US)

(72) Inventors: Xiangying Yang, Cupertino, CA (US); Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/141,482

(22) Filed: Sep. 25, 2018

(65) Prior Publication Data

US 2019/0098475 A1 Mar. 28, 2019

Related U.S. Application Data

(60) Provisional application No. 62/563,446, filed on Sep. 26, 2017.

(51) Int. Cl.
*H04W 4/60* (2018.01)
(52) U.S. Cl.
CPC .................................... *H04W 4/60* (2018.02)
(58) Field of Classification Search
CPC ....................................................... H04W 4/60
USPC ......................................................... 455/418
See application file for complete search history.

(56) References Cited

PUBLICATIONS

"RSP Technical Specification, Version 2.1," GSM Association, Feb. 27, 2017, 247 pages.
"Smart Cards; Card Application Toolkit (CAT), (Release 12)," ETSI TS 102 223, V12.1.0, Sep. 2014, 244 pages.
"Smart Cards; UICC-Terminal interface; Physical and logical characteristics (Release 8)," ETSI TS 102 221, V8.2.0, Jun. 2006, 174 pages.

*Primary Examiner* — Joel Ajayi
(74) *Attorney, Agent, or Firm* — Dickinson Wright RLLP

(57) ABSTRACT

An electronic universal integrated circuit card (eUICC) performs one or more operations to increase the reliability and decrease the execution time of remote profile management (RPM) commands or local profile management (LPM) commands. In some embodiments, the eUICC scans through a received script containing RPM commands and then selectively defers some responsive actions such as refresh commands. An eSIM server that originates the script, in some embodiments, mandates performance of a refresh command after a particular RPM command by including an explicit refresh command code in the script. In some embodiments, the eSIM server includes a command instructing the eUICC to hold responsive refresh commands until the completion of the script. In some scenarios, execution of one or more RPM or LPM commands may be interfered with by a card application toolkit (CAT) session. Embodiments provided herein prioritize the RPM/LPM commands as more important than the CAT session.

20 Claims, 13 Drawing Sheets

*-- Prior Art --*

200

```
     ┌──────────────┐
     │ AT AN eUICC  │
     └──────┬───────┘
            ▼
┌─────────────────────────────────────────────────────────┐
│ WHILE EXECUTING A REMOTE PROFILE MANAGEMENT (RPM)       │ ~202
│ SCRIPT, DEFER A REFRESH COMMAND.                        │
└─────────────────────────┬───────────────────────────────┘
                          ▼
┌─────────────────────────────────────────────────────────┐
│ AT THE COMPLETION OF THE RPM SCRIPT, EXECUTE THE        │ ~204
│ REFRESH COMMAND.                                        │
└─────────────────────────────────────────────────────────┘
```

*FIG. 2A*

EMBEDDED UNIVERSAL INTEGRATED CIRCUIT CARD (EUICC) COMMAND PROCESSING

CROSS-REFERENCE TO RELATED APPLICATIONS

This Application claims the benefit of U.S. Provisional Application No. 62/563,446, entitled "EMBEDDED UNIVERSAL INTEGRATED CIRCUIT CARD (eUICC) COMMAND PROCESSING," filed Sep. 26, 2017, which is incorporated by reference herein in its entirety for all purposes.

FIELD

The described embodiments relate to efficient processing of commands by an embedded universal integrated circuit card (eUICC).

BACKGROUND

An eUICC is a secure element (SE) for hosting profiles. A profile is a combination of operator data and applications provisioned on an eUICC in a wireless device for the purposes of providing services by an operator. A profile is also referred to herein as an electronic subscriber identity module (eSIM). A profile can contain secure data used to prove identity and thus verify contractual rights to access services. A universal integrated circuit card (UICC) is, in general, a removable SE, while an eUICC is, in general, a non-removable embedded SE.

A profile can be identified by a unique number referred to as an ICCID (Integrated Circuit Card Identifier). Profile management can include a combination of local and remote management operations such enable a profile, disable a profile, delete a profile, and query profiles present on an eUICC. An operator is a company that provides wireless cellular network services. A mobile network operator (MNO) is an entity providing access capability and communication services to its subscribers through a mobile cellular wireless network infrastructure. An MNO may also be referred to as a service provider (SP). In some cases, a wireless device is user equipment used in conjunction with an eUICC to connect to a mobile network. In a machine-to-machine (M2M) environment, a wireless device may not be associated with a user and may lack a user interface. An end user is a person using a (consumer or enterprise) wireless device. An enabled profile can include files and/or applications that are selectable over an eUICC-device interface.

A network entity that provides profile packages is referred to as a subscription manager data preparation (SM-DP, or SM-DP+). An SM-DP may also be referred to as an eSIM server, a profile provider, or an eSIM vendor. An eSIM is an example of a profile. A profile package can be a personalized profile that uses an interoperable description format that is transmitted to an eUICC as a basis for loading and installing a profile. Profile data that is unique to a subscriber, e.g., a phone number or an International Mobile Subscriber Identity (IMSI), are examples of personalization data. An SM-DP can communicate over an interface with an eUICC. Certificates used for authentication and confidentiality purposes can be generated by a trusted certificate issuer.

An eUICC includes an operating system, and the operating system can include an ability to provide authentication algorithms to network access applications associated with a given operator. The operating system also can include the ability to translate profile package data into an installed profile using a specific internal format of the eUICC. An ISD-P (issuer security domain-profile) can host a unique profile within an eUICC. An ECASD (embedded UICC controlling authority security domain) can provide secure storage of credentials needed to support security domains on an eUICC. A controlling authority security domain (CASD) may also be referred to as a "key store" herein. A security domain within the eUICC can contain an operator's over the air (OTA) keys and provides a secure OTA channel for secure communication between the eUICC and a network entity of the operator. OTA keys are credentials used by an operator for remote management of operator profiles on an eUICC.

Network device, eUICC, and profile interactions are described in GSM Association document GSMA SGP.22: "RSP Technical Specification" (hereinafter "SGP.22"). Some eUICC procedures are given in: i) "Smart Cards: Card Application Toolkit (CAT)," ETSI TS 102.223 (hereinafter "ETSI 102.223") and ii) "Smart Cards; UICC-Terminal interface; Physical and logical characteristics," ETSI TS 102.221 (hereinafter "ETSI 102.221").

FIG. 1 illustrates a diagram 100 of a system in which an eSIM server 120 is in communication with a wireless device 101. The wireless device 101 includes an eUICC 105 and executes a local profile assistant (LPA) 110, external to the eUICC 105, to assist with profile loading to the eUICC 105. At event 101, the eSIM server 120 forms a package 102. At event 103, the package 102 is downloaded to the LPA 110. At event 106, the package 102 is installed in the eUICC 105. At event 107, the eUICC 105 processes the package 102. The package 102 includes a script of remote profile management (RPM) commands.

The system illustrated in FIG. 1 has several drawbacks. The eUICC 105 acts on the RPM commands in the script one by one. The eUICC 105 may stop execution of the script upon an execution error. Multiple RPM commands may result in multiple refresh commands, some of which are unnecessary. Unnecessary command processing increases a risk of error and halting execution. More details on refresh commands can be found in ETSI 102.223.

SUMMARY

Representative embodiments set forth herein disclose various systems and techniques for efficient processing of remote profile management (RPM) commands and/or local profile management (LPM) commands.

Multiple RPM or LPM commands may result in multiple refresh commands from an eUICC. Multiple refresh commands are not necessary in some instances and may cause interruptions. Also, RPM commands may collide or be blocked by ongoing eUICC activities (e.g., proactive command sessions, such as card application toolkit (CAT) sessions). An ongoing CAT session may interfere with successful reception and execution of received RPM commands by the eUICC thereby reducing reliability.

As a concrete example, an eUICC of a wireless device may receive an RPM script from a local profile assistant (LPA) that is executing on a processor external to the eUICC of the wireless device. The RPM script may include commands such as Disable Profile 1, Delete Profile 1, and Enable Profile 2. The eUICC may attempt to execute a first refresh command after disabling profile 1 and a second refresh command after enabling profile 2. The first refresh command, however, may not account for the yet to be executed second refresh command. In embodiments provided herein, the existence of the second refresh command is recognized in advance. In some instances, the effect of executing the first and second refresh commands is attained by executing a single refresh command (instead of two distinct refresh commands) after enabling the second profile. After execution of the single refresh command at the end of the script, the LPA performs a memory read or request information operation and obtains fresh state information regarding the eUICC (in this example, the fresh information includes the fact that the second profile is enabled). More information on refresh commands can be found in ETSI 102.223.

In some embodiments, the eUICC scans an RPM script and recognizes that a Disable Profile 1 command and an Enable Profile 2 command will both change a state in the eUICC, about which the LPA needs to know. A single refresh command, after enabling the second profile, provides the information needed by the LPA without requiring processing between the eUICC and the LPA of a refresh command directly followed by performance of the Disable Profile 1 command.

In some embodiments, the RPM script includes an explicit refresh command that mandates the eUICC perform a refresh following a particular command.

In some embodiments, the eSIM server forms the RPM script and subsequently examines the RPM script. If a sequence of commands in the RPM script will cause the eUICC to attempt more than one refresh during execution of the RPM script, the eSIM server inserts a Hold Refresh command at the beginning of the RPM script. The eUICC parses the Hold Refresh command while executing the RPM script. When the eUICC has completed, in the concrete example above, the Disable Profile 1 command, the eUICC defers performing a refresh until the end of the RPM script. At the end of the RPM script, if there are one or more refresh commands to be performed, the eUICC then executes a refresh command, and the LPA performs a memory read or request information operation and obtains fresh state information regarding the eUICC.

In some instances, an eUICC takes proactive actions to establish sessions such as described in ETSI 102.223. These sessions may be referred to as card application toolkit (CAT) sessions. Examples of CAT sessions include (i) an over the air (OTA) session using a bearer independent protocol (BIP) channel and (ii) opening a window on a user device screen for communication with a user. These CAT sessions may interfere with, interrupt, or block performance of RPM commands. In embodiments provided herein, when the eUICC recognizes an RPM command, the eUICC closes all ongoing CAT sessions and ignores CAT-related messages received from the wireless device while providing priority processing to one or more RPM commands. Closing a CAT session, in some embodiments, includes closing a logical channel associated with the CAT session. More information on logical channels can be found in ETSI 102.221.

In general, profile management commands may originate from a remote server (e.g., RPM commands) or from a user of the wireless device (e.g., LPM commands). The embodiments described herein with respect to RPM commands are generally also applicable to LPM commands. For example, both RPM commands and LPM commands are given priority over CAT sessions.

The embodiments provided herein apply to secure elements in general, including both eUICCs and UICCs.

This Summary is provided for purposes of summarizing some example embodiments so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 2A illustrates exemplary logic for an eUICC deferring a refresh command, according to some embodiments.

DETAILED DESCRIPTION

Figure 1:
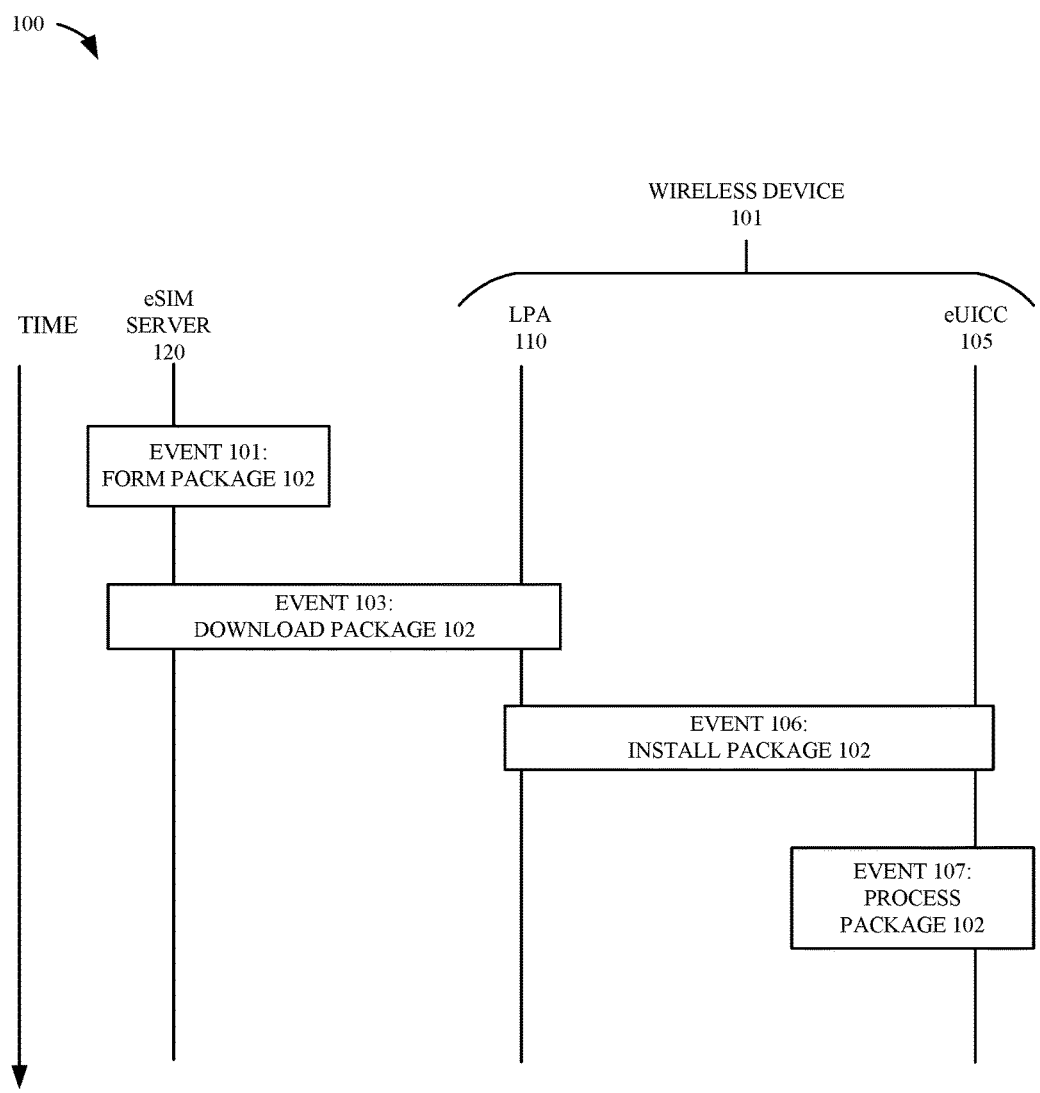
FIG. 1 illustrates formation, transmission, and processing of a package by an eUICC.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Representative embodiments set forth herein disclose various systems and techniques for efficient processing of remote profile management (RPM) commands and/or local profile management (LPM) commands.

Multiple RPM or LPM commands may result in multiple refresh commands from an eUICC. Multiple refresh commands are not necessary in some instances and may cause interruptions. Also, RPM commands may collide or be blocked by ongoing eUICC activities (e.g., proactive command sessions, such as card application toolkit (CAT) sessions). An ongoing CAT session may interfere with successful reception and execution of received RPM commands by the eUICC thereby reducing reliability.

As a concrete example, an eUICC of a wireless device may receive an RPM script from a local profile assistant (LPA) that is executing on a processor external to the eUICC of the wireless device. The RPM script may include commands such as Disable Profile 1, Delete Profile 1, and Enable Profile 2. The eUICC may attempt to execute a first refresh command after disabling profile 1 and a second refresh command after enabling profile 2. The first refresh command, however, may not account for the yet to be executed second refresh command. In embodiments provided herein, the existence of the second refresh command is recognized in advance. In some instances, the effect of executing the first and second refresh commands is attained by executing a single refresh command (instead of two distinct refresh commands) after enabling the second profile. After execution of the single refresh command at the end of the script, the LPA performs a memory read or request information operation and obtains fresh state information regarding the eUICC (in this example, the fresh information includes the fact that the second profile is enabled). More information on refresh commands can be found in ETSI 102.223.

In some embodiments, the eUICC scans an RPM script and recognizes that a Disable Profile 1 command and an Enable Profile 2 command will both change a state in the eUICC, about which the LPA needs to know. A single refresh command, after enabling the second profile, provides the information needed by the LPA without requiring processing between the eUICC and the LPA of a refresh command directly following by performance of the Disable Profile 1 command.

In some embodiments, the RPM script includes an explicit refresh command that mandates the eUICC perform a refresh following a particular command.

In some embodiments, the eSIM server forms the RPM script and subsequently examines the RPM script. If a sequence of commands in the RPM script will cause the eUICC to attempt more than one refresh during execution of the RPM script, the eSIM server inserts a Hold Refresh command at the beginning of the RPM script. The eUICC parses the Hold Refresh command while executing the RPM script. When the eUICC has completed, in the concrete example above, the Disable Profile 1 command, the eUICC defers performing a refresh until the end of the RPM script. At the end of the RPM script, if there are one or more refresh commands to be performed, the eUICC then executes a refresh command, and the LPA performs a memory read or request information operation and obtains fresh state information regarding the eUICC.

In some instances, an eUICC takes proactive actions to establish sessions such as described in ETSI 102.223. These sessions may be referred to as card application toolkit (CAT) sessions. Examples of CAT sessions include (i) an over the air (OTA) session using a bearer independent protocol (BIP) channel and (ii) opening a window on a user device screen for communication with a user. These CAT sessions may interfere with, interrupt, or block performance of RPM commands. In embodiments provided herein, when the eUICC recognizes an RPM command, the eUICC closes all ongoing CAT sessions and ignores CAT-related messages received from the wireless device while providing priority processing to one or more RPM commands. Closing a CAT session, in some embodiments, includes closing a logical channel associated with the CAT session. More information on logical channels can be found in ETSI 102.221.

In general, profile management commands may originate from a remote server (e.g., RPM commands) or from a user of the wireless device (e.g., LPM commands). The embodiments described herein with respect to RPM commands are generally also applicable to LPM commands. For example, both RPM commands and LPM commands are given priority over CAT sessions.

The embodiments provided herein apply to secure elements in general, including both eUICCs and UICCs.

Deferral of Refresh Command

FIG. 2A illustrates exemplary logic 200 for an eUICC deferring a refresh command. At 202, while executing an RPM script, the eUICC defers a refresh command. At 204, at completion of the RPM script, the eUICC executes the refresh command. By executing a single refresh command at the end of the RPM script, the eUICC completes the RPM script more quickly and with less chance of execution errors. Avoiding execution errors avoids interruption of script execution.

In a representative example, the RPM script may specify that a first eSIM be disabled before a second eSIM is enabled. The eUICC of FIG. 1 would execute a refresh command after disabling the first eSIM. (An eSIM may also be referred to as a profile herein.) The term "enabling" an eSIM (or profile) can refer to selection of the eSIM as the basis for network access including providing for the use of an authentication and key agreement (AKA) protocol to initiate network access. The AKA protocol may or may not be performed at the time the eSIM is enabled. More information on authentication and key agreement protocols can be found in SGP.22.

According to the logic of FIG. 2A, the eUICC defers performing the refresh command after disabling the first eSIM because the RPM script also specifies enabling a second eSIM (profile). Enabling the second eSIM (profile) also results in execution of a refresh command. The eUICC defers the first refresh command (for the state change resulting from disabling the first eSIM) and the performs a single refresh command (for the state change to both the first and second eSIMs) to satisfy requirements to update the LPA resulting from the disabling of the first eSIM and from the subsequent enabling of the second eSIM.

To maintain at the LPA current information on the status of eSIMs in the eUICC, the eUICC sends to the LPA a refresh command to cause the LPA to perform a memory read to obtain the current information, including the status of the various eSIMs in the eUICC, such as which eSIMs are enabled and which eSIMs are disabled.

System

Figure 2B:
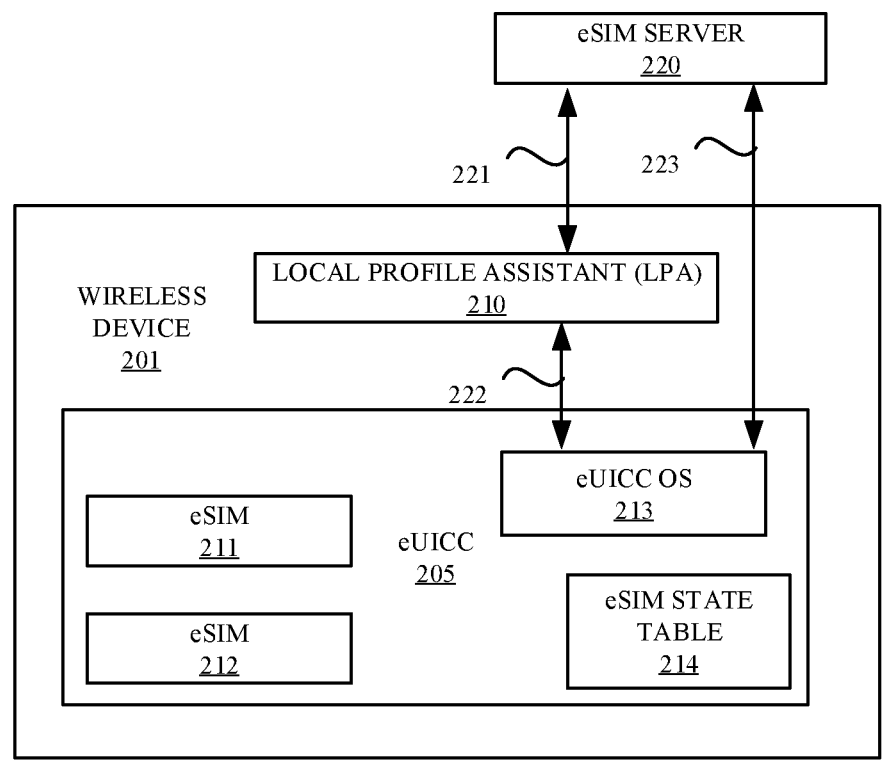
FIG. 2B illustrates an exemplary system for performance of the logic of FIG. 2A, according to some embodiments.

FIG. 2B illustrates a diagram 206 of an exemplary system that includes an eSIM server 220 in communication with a wireless device 201 that includes an LPA 210 and an eUICC 205. The LPA 210 may be executed as logic in an application processor or a baseband processor of the wireless device 201. The eUICC 205 includes an operating system (OS), shown as eUICC OS 213. The eSIM server 220 communicates with the LPA 210 over interface 221, and with the eUICC OS 213 over interface 223. In some embodiments, interface 221 may be an ES9 interface (see SGP.22), and interface 223 may be an ES8 interface. The LPA 210 communicates internal to the wireless device 201 with the eUICC OS 213 via interface 222, which, in some embodiments, may be an ES10 interface (see SGP.22). The eUICC 205 includes an eSIM 211 and an eSIM 212. In memory (not shown), the eUICC 205 stores an eSIM state table 214.

The eSIM state table 214 contains state information about eSIMs on the eUICC 205. For instance, for the scenario depicted in FIG. 2B, the eSIM state table 214 can indicate that eSIM 211 and eSIM 212 are installed on the eUICC. In some instances, the eSIM 211 is enabled and the eSIM 212 is disabled, at a first time, and corresponding entries for the respective eSIMs in the eSIM state table can indicate "eSIM 211 enabled" and "eSIM 212 disabled". After execution of certain RPM commands, the state of the eSIMs in the eUICC 205 may change, and the resulting state change for the eSIMs can be reflected in their respective entries of the eSIM state table 214. Transient values in the eUICC state during script execution may not be of interest to the LPA 210 of the wireless device 201. For example, if execution of an RPM script causes the eSIM 211 to be disabled and then deleted, and subsequently the eSIM 212 to be enabled, the eSIM state table 214 will, after completion of the RPM script, list eSIM 212 as installed with the status "eSIM 212 enabled." Upon execution of a refresh command sent by the eUICC OS 213, the LPA 210 will request information or perform a memory access to read contents of the eSIM state table 214. With this refresh and memory access, the wireless device 201 learns, after execution of the RPM script, that eSIM 212 is enabled. The LPA 210 does not need to receive a refresh command in the middle of execution of the RPM script, as such a refresh command mid-script would lead to observing a transient status, e.g., a state in which no eSIM (profile) is enabled, for example, after disabling eSIM 211 and before enabling eSIM 212.

The logic of FIGS. 2A, 2C, 3, 4, 5, and 6 can be performed by one or more of the entities in FIG. 2B.

Exemplary Events

Figure 2C:
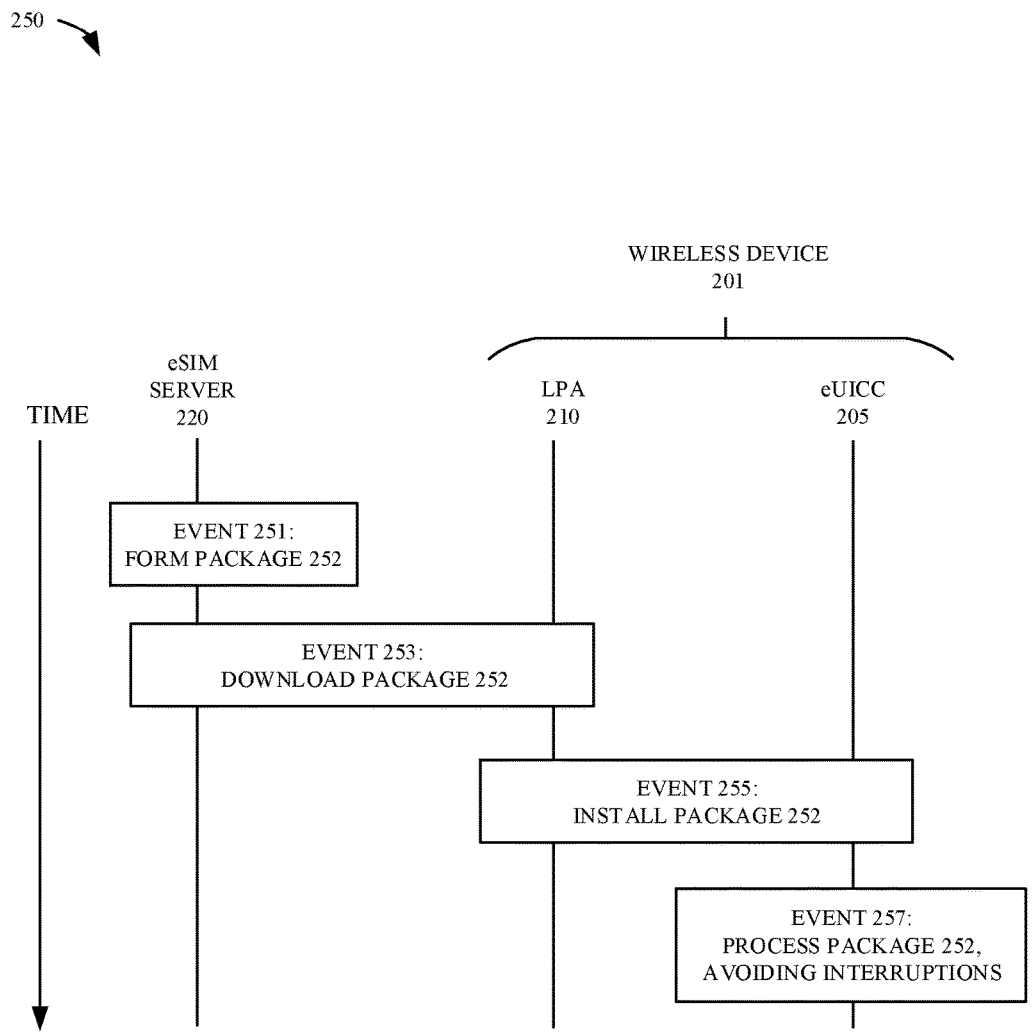
FIG. 2C illustrates exemplary events for formation, transmission, and processing of a package by an eUICC avoiding interruptions, according to some embodiments.

FIG. 2C illustrates a diagram 250 of exemplary events according to some embodiments disclosed herein. At event 251, the eSIM server 220 forms a package 252 including an RPM script. The RPM script, in some embodiments, is formatted as an ASN.1 script code. At event 253, the package 252 is downloaded to the LPA 210 of the wireless device 201. At event 255, the package 252 is downloaded from the LPA 210 to the eUICC 205 of the wireless device 201. At event 257, the eUICC 205, in particular the eUICC OS 213 of the eUICC 205, begins execution of the RPM script obtained from the package 252.

Event 251, in some embodiments, includes the eSIM server 220 analyzing the RPM script for a number of refresh commands that can be triggered during RPM script execution and inserting a command into the RPM script that allows the eUICC 205 to defer execution of one or more refresh commands.

In some embodiments, the eSIM server 220 inserts into the RPM script code for an explicit refresh command, linked with code for a previous RPM command, thereby requiring that the eUICC OS 213 perform a refresh command after the RPM command with which the explicit refresh command is linked. For example, the RPM script may include an UpdateMetadataRequest command, and the RPM script may specify that the eUICC OS 213, when executing the RPM script from package 252, execute a refresh command directly after performing the UpdateMetadataRequest command.

Various Logic

Figure 3:
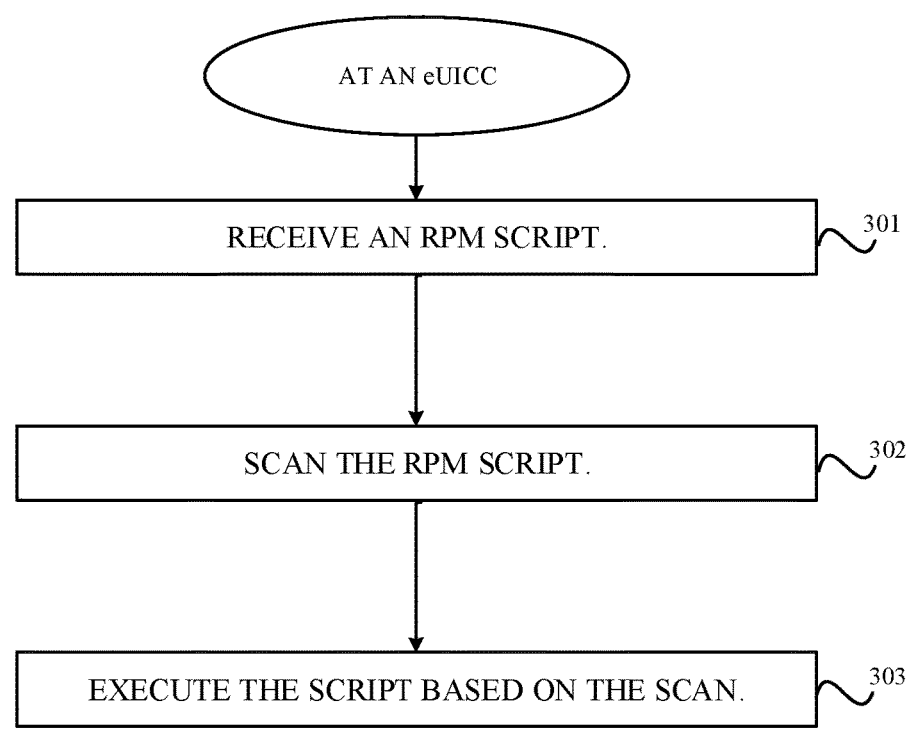
FIG. 3 illustrates exemplary logic for an eUICC including scanning a script received in a package, according to some embodiments.

FIG. 3 illustrates exemplary logic 300 for an eUICC 205 scanning an RPM script, according to some embodiments. At 301, the eUICC 205 receives an RPM script, for instance included in a package, such as package 252. At 302, the eUICC 205 scans the RPM script. Scanning refers to the eUICC examining the sequence of commands in the RPM script and determining what transactions between the eUICC 205 and the LPA 210 are implied by execution of the sequence of commands in the RPM script. A goal of the scan is to determine if some of the LPA transactions can be deferred or consolidated when performing the RPM script. Deferring and/or consolidating actions will tend to decrease the opportunity for error events that might halt execution of the RPM script. Recovery from an error during RPM script execution is complicated in part due to the eSIM server 220 having little or no knowledge of the state of the eUICC OS 213 when an error event occurs. Avoiding error events is thus beneficial to smooth execution of the RPM script. Additionally, consolidating actions of the RPM script generally leads to completion of the RPM script in less time. An end user of the wireless device 201 may wait for the RPM script to complete, and reducing such time is important to the end user to allow for continued use of the wireless device 201. Deferral of actions during RPM script execution, in some embodiments, can be performed as part of an eUICC OS implementation and does not require changes to the logic of the wireless device 201 that implements the LPA 210.

At 303, the eUICC 205 executes the RPM script based on the scan. For example, if the RPM script includes two commands, each of which implies performance of a refresh command by the eUICC 205, the eUICC 205, in some embodiments, performs a single refresh command after executing the first and second commands rather than two separate refresh commands after each of the first and second commands. In some embodiments, at 303, if the eUICC 205 recognizes that the RPM script includes an explicit command to perform a refresh command after a particularly indicated ("linked") RPM script command, then the eUICC 205 does not consolidate or defer the refresh for that particular linked RPM script command, and instead the eUICC 205 performs the explicitly indicated refresh directly after the linked RPM script command. In some embodiments, at 303, the wireless device 201 determines that a first command implies performance of a refresh command and that a sequential next command relies on the performance of that refresh after the first command (and before the sequential next command). In this situation in which the refresh is relied upon for proper subsequent execution of a further command, the eUICC 205 performs the refresh after the first command.

Figure 4:
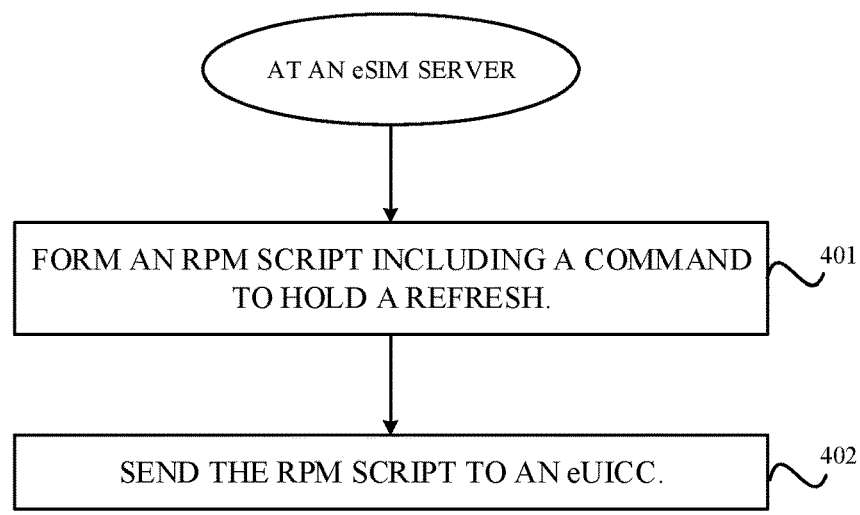
FIG. 4 illustrates exemplary logic for an eSIM server including forming a script with a refresh-related command, according to some embodiments.

FIG. 4 illustrates exemplary logic 400 for an eSIM server 220. At 401, the eSIM server 220 has determined that execution of refresh commands implied by the RPM script can be deferred or held until completion of the RPM script. The eSIM server 220 places an explicit script processing command, for example "Hold Refresh" at the beginning of the RPM script. The eSIM server 220 then, at 402, sends the RPM script to an eUICC 205 of a wireless device 201, such as via the event sequence illustrated in FIG. 2C. When the eUICC 205 begins execution of the RPM script, the explicit Hold Refresh command indicates to the eUICC 205 to execute a single refresh at completion of the RPM script. Thus, the eUICC 205 reads the Hold Refresh command, executes the remaining lines of the RPM script without sending a refresh command to the LPA 210, and then the eUICC 205 will execute a refresh command. The LPA 210 learns the final state of the eUICC 205 after completion of the entire RPM script, rather than intermediate states of the eUICC 205 during execution of the RPM script.

Avoiding Card Application Toolkit Interference

An eUICC can perform proactive sessions that are called card application toolkit (CAT) sessions. CAT sessions are described, e.g., in ETSI 102.223. Examples of CAT sessions include (i) an over the air (OTA) session using a bearer independent protocol (BIP) channel, and (ii) opening a window on a user device screen for communication with a user. CAT sessions may interfere with, interrupt, or block performance of RPM commands. More information on OTA and BIP can be found in SGP.22.

Performance of RPM or local profile management (LPM) commands such as enable profile (enable eSIM), disable profile (disable eSIM), and reset (e.g., eUICC memory reset) may be interfered with by a CAT session. When execution of the RPM or LPM command is attempted, the eUICC 205 may send an error signal referred to as "catBusy" (see SGP.22). After a catBusy error event, the entire RPM script can fail, in some instances. Attempting to retry script execution is difficult, particularly for an RPM script, as the forming, downloading, installing, and executing of the script is performed by a number of distinct entities (e.g., as illustrated by the multiple entities of FIGS. 1 and 2C).

Embodiments provided herein address the interference of a CAT session with one or more RPM or LPM commands by giving priority to the RPM or LPM commands over CAT session transactions. The RPM commands may originate with an eSIM server 220 (e.g., FIG. 2C), while the LPM commands may originate from a user (not shown in FIG. 2C) of a wireless device 201. In embodiments provided herein, eUICC-originated CAT sessions that originate from the eUICC 205 of a wireless device 201 are given a lowest priority (or a priority lower than provided for execution of RPM and LPM commands). Priority can be established for the execution of actions to allow completion of RPM or LPM commands coming from either an eSIM server 220 or from a user of the wireless device 201.

In embodiments provided herein, when the eUICC 205 recognizes an RPM/LPM command, the eUICC 205 closes ongoing CAT sessions instead of sending a catBusy error message. The eUICC 205 then ignores CAT-related messages received from the wireless device 201, while providing priority processing to one or more RPM/LPM commands. Closing a CAT session, in some embodiments, includes closing a logical channel associated with the CAT session and/or releasing a portion of cache memory associated with the CAT session. A wireless device 201 processor that implements an LPA 210 may become misaligned in terms of protocol sequencing of the CAT session (which can be remain open at the LPA 210 end, even though closed at the eUICC 205 end). A terminal response from the LPA 210 to the eUICC 205 from the ongoing (from the perspective of the LPA 210) CAT session is silently ignored by the eUICC 205. By this approach, RPM/LPM commands are performed with a higher reliability even when the eUICC 205 has commenced a CAT session before arrival of the RPM/LPM commands.

Figure 5:
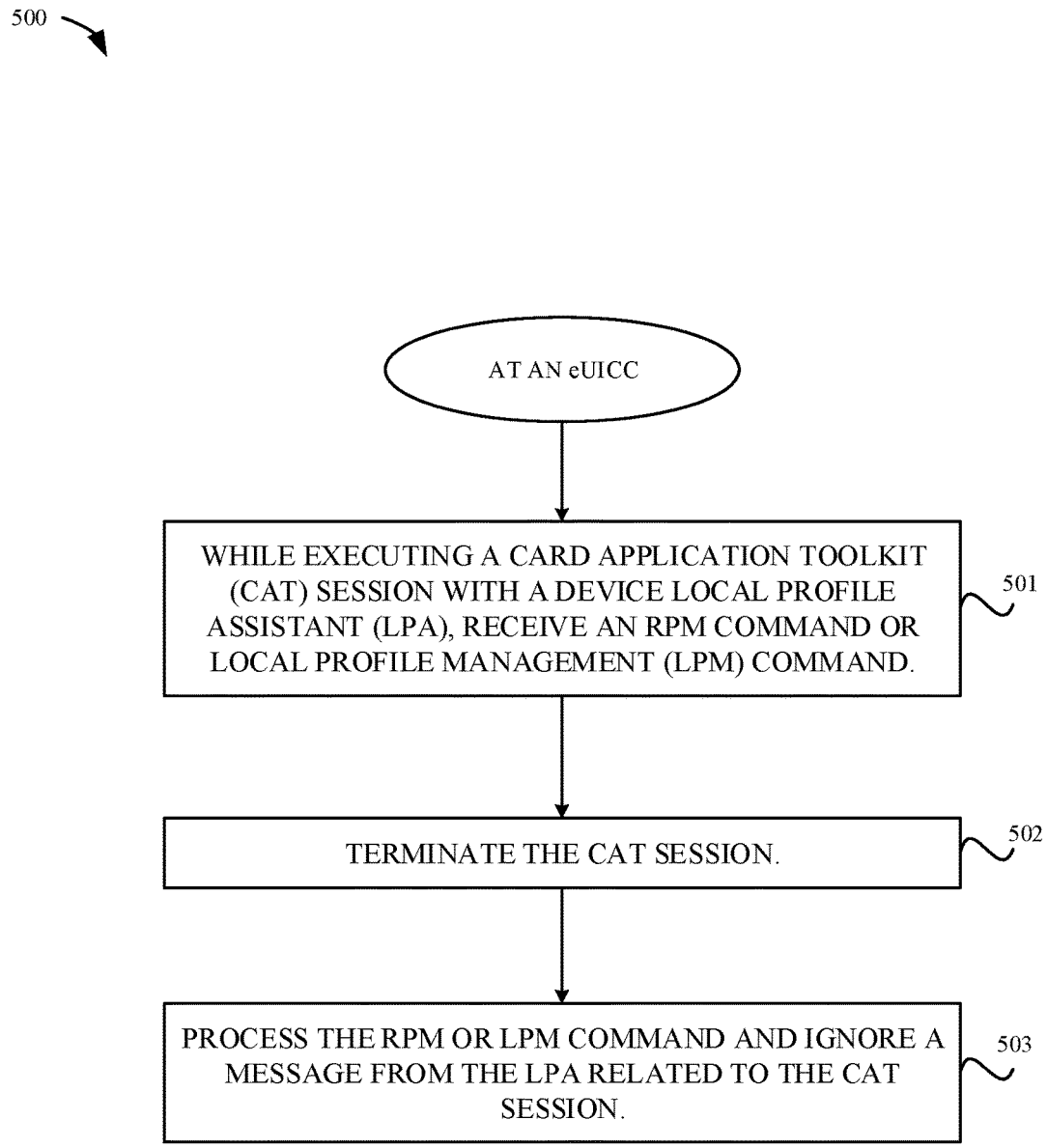
FIG. 5 illustrates exemplary logic for an eUICC terminating a CAT session in order to process an RPM command or an LPM command, according to some embodiments.

FIG. 5 illustrates exemplary logic 500 performed at an eUICC 205 of a wireless device 201 to avoid interference from a CAT session. At 501, while executing a CAT session, the eUICC 205 receives an RPM command or an LPM command; the command may be from an eSIM server 220 or from a user of the wireless device 201. In general, an RPM command or an LPM command may be referred to as a profile management command. At 502, the eUICC 205 terminates (also called "closes") the CAT session. The CAT session can be closed by deleting one or more logical channels associated with the CAT session and/or by releasing a portion of cache memory associated with the CAT session. At 503, the eUICC 205 processes the RPM command or the LPM command. If a CAT-related message is received from an LPA 210 of the wireless device 201, the eUICC 205 ignores the CAT-related message.

Figure 6:
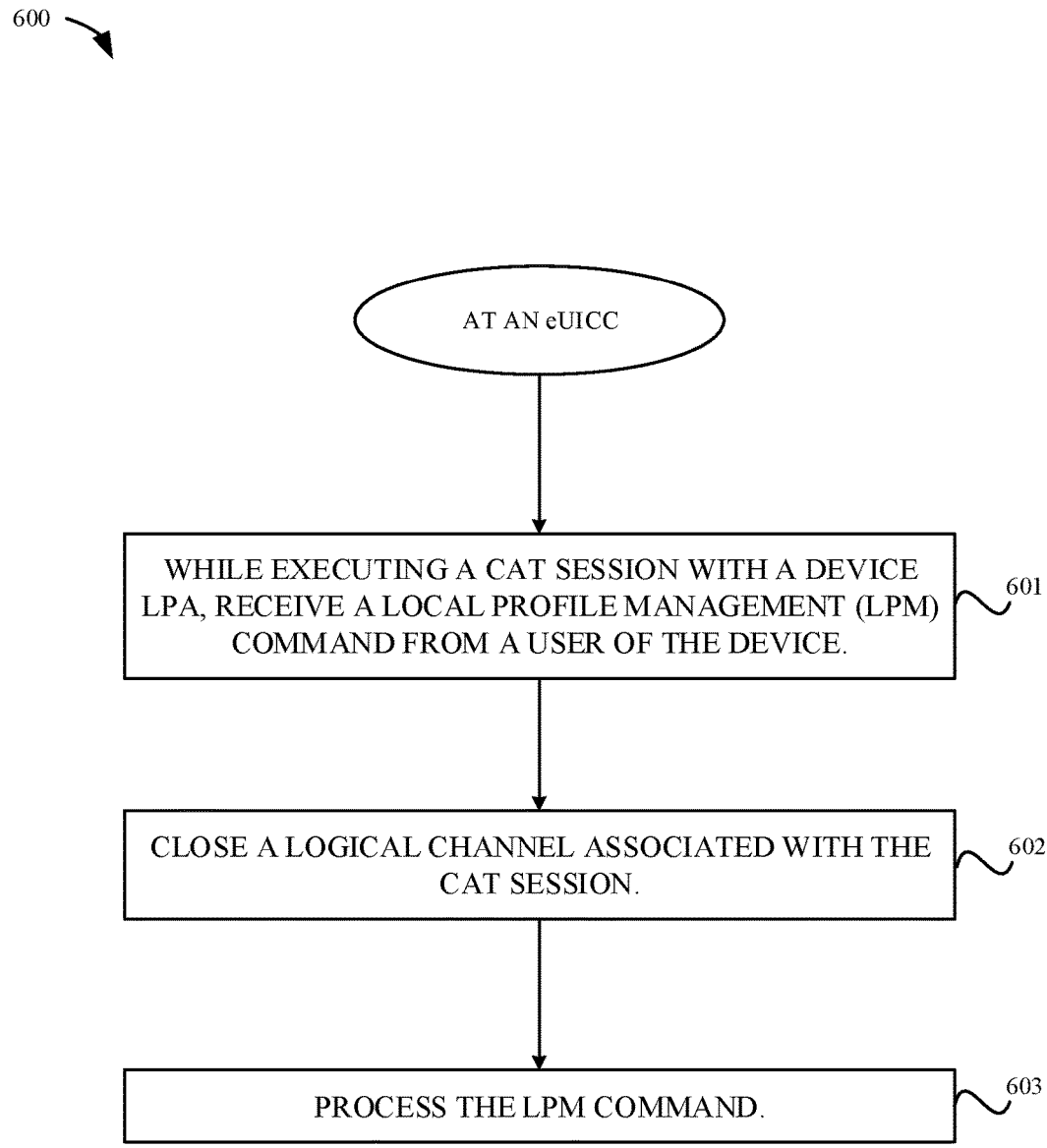
FIG. 6 illustrates exemplary logic for an eUICC closing a logical channel of a CAT session in order to process an RPM command or an LPM command, according to some embodiments.

FIG. 6 illustrates additional exemplary logic 600 performed at an eUICC 205 of a wireless device 201 to avoid interference from a CAT session. At 601, the eUICC 205 receives an RPM command or an LPM command while conducting a CAT session. In logic 600, the LPM command can be from a user of the wireless device 201. At 602, the eUICC 205 closes a logical channel associated with the CAT session. At 603, the eUICC 205 processes the LPM command.

Example Connection Methods

Figure 7:
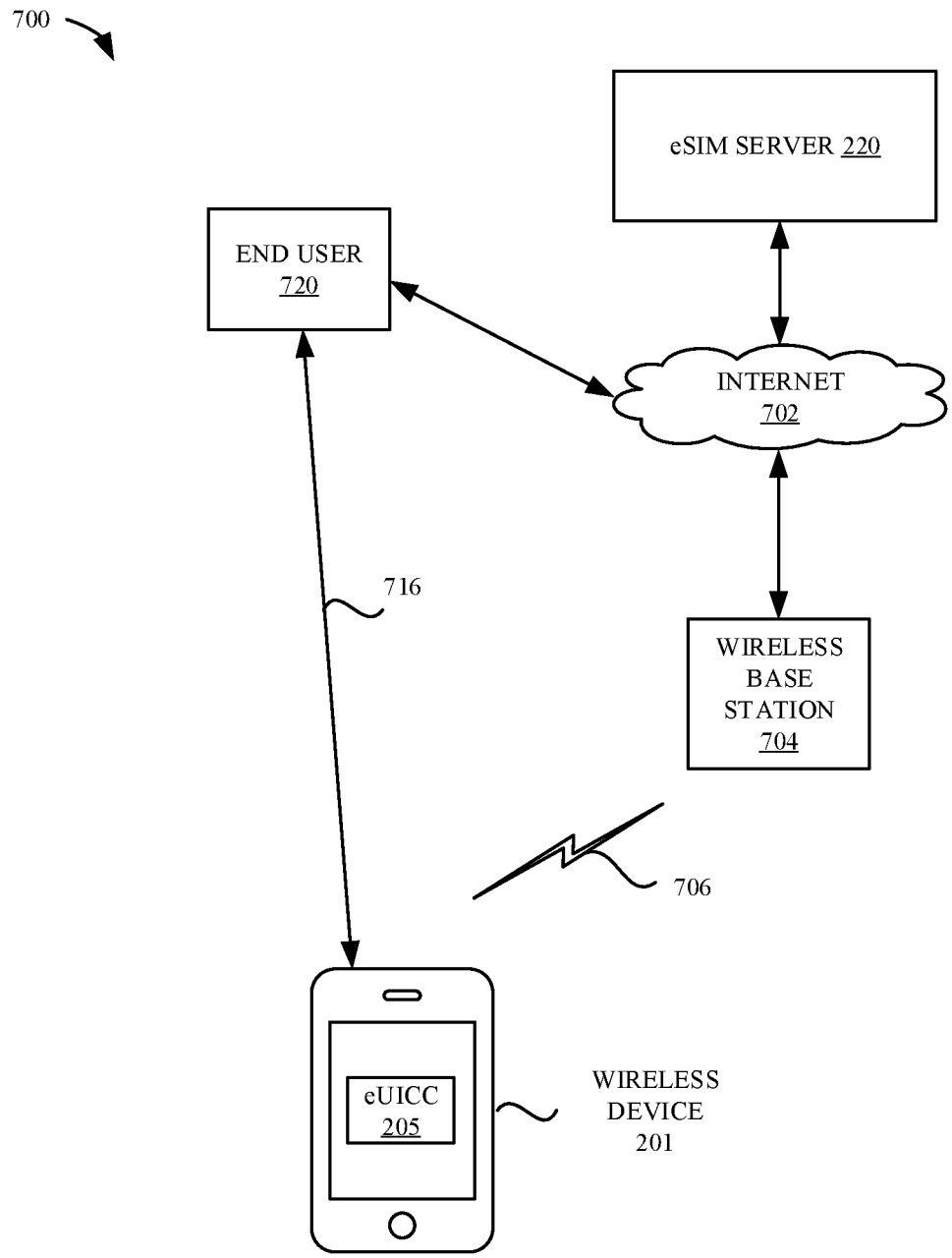
FIG. 7 illustrates exemplary interconnections of a wireless device including an eUICC, according to some embodiments.

FIG. 7 illustrates a diagram 700 of an exemplary system with connections for performing notifications for an eUICC 205 housed in a wireless device 201. The eSIM server 220 is connected to the Internet 702. An end user 720 can locally manage the wireless device 201 via interface 716, which can represent end user actions. The end user 720 can also remotely manage the wireless device 201 via the Internet 702. The wireless device 201 is connected to a wireless base station 704 via a wireless link 706. The wireless base station 704 can be an Institute of Electronic and Electrical Engineers 802.11 Wireless Fidelity (IEEE 802.11 Wi-Fi) access point (AP) or an access network entity of a cellular wireless network. Examples of access network entities include a 2G base station, a 3G base station (also referred to as a NodeB), or a Long Term Evolution (LTE) evolved NodeB (eNodeB), and a next generation (5G) NodeB (gNodeB). The wireless device 201 can also connect to the Internet 702 via a wired connection (not shown).

Further eUICC and eSIM Details

Figure 8A:
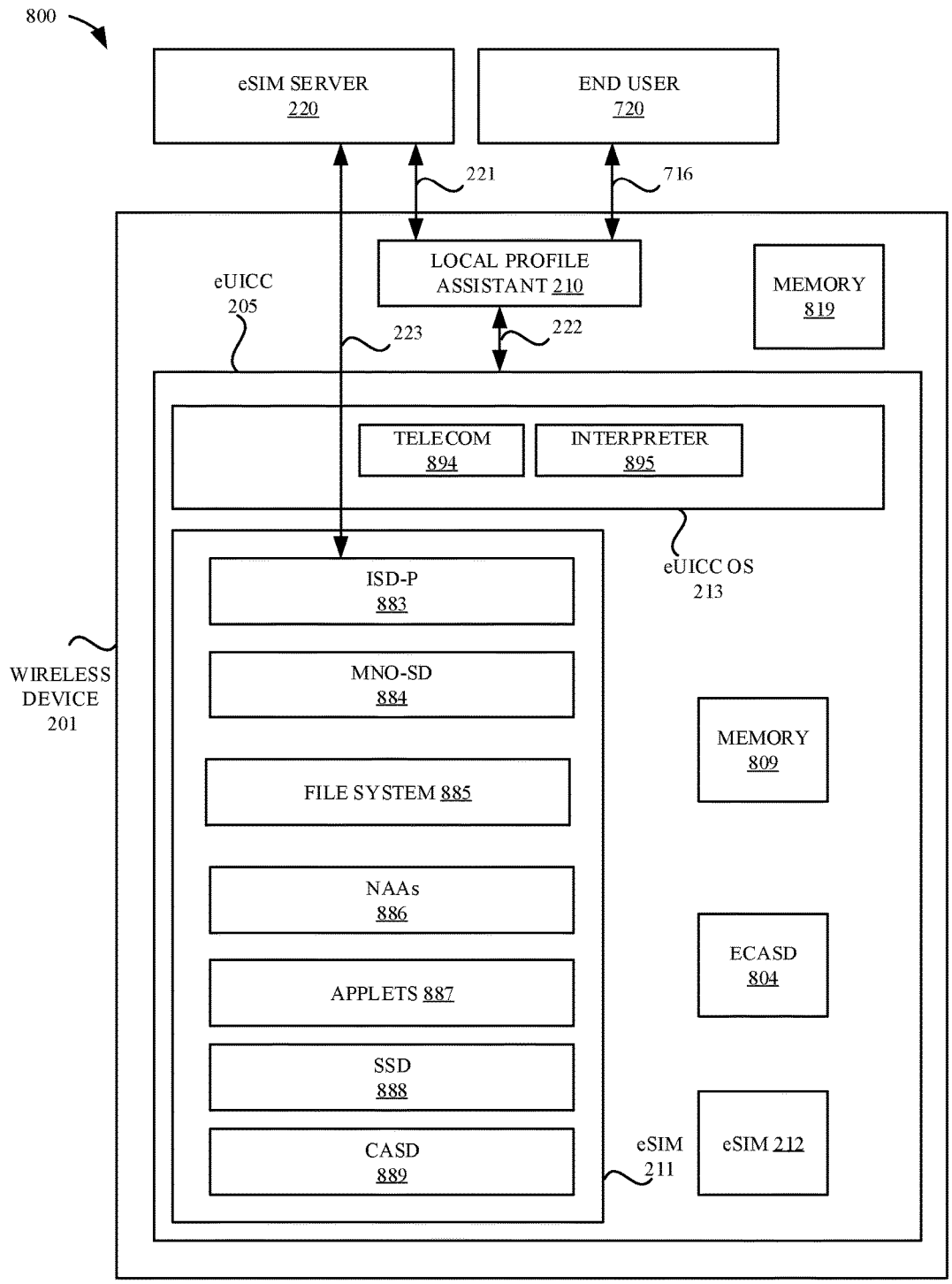
FIG. 8A illustrates exemplary details of FIG. 2B, including eSIM details, according to some embodiments.

FIG. 8A illustrates exemplary details of an eUICC 205 of a wireless device 201 in a system 800. The eUICC 205 includes an operating system (eUICC OS 213). The eUICC OS 213 includes a telecom framework 894, which provides authentication algorithms to network access applications (such as NAAs 886 of eSIM 211). The eUICC OS 213 also includes an interpreter 895, which translates profile package data into an installed profile using a specific internal format of the eUICC 205. An ISD-P 883 hosts the eSIM 211. An event processed by the wireless device 201 with the eUICC 205 can include, for example, installing, enabling, or disabling of the eSIM 211 in cooperation with the eSIM server 220. Also present on the eUICC 205 is another eSIM 212. The eUICC 205 includes a memory 809.

The ISD-P is a secure container (security domain) for hosting the eSIM 211. The ISD-P is used for profile download and installation in collaboration with the interpreter 895 for decoding of a bound profile package, which can be received from the eSIM server 220. ECASD 804 provides secure storage of credentials needed to support the security domains on the eUICC 205. The Mobile Network Operator-Security Domain (MNO-SD) 884 is a representative on the eUICC 205 of an MNO, providing services to the end user 720 of the wireless device 201. The MNO-SD 884 contains OTA keys for the MNO and provides a secure OTA channel. Further description of profile management in an eUICC 205 can be found in SGP.22.

The eSIM 211 generally includes a file system 885, applets 887, a certificate authority security domain (CASD) 889, and a supplemental security domain (SSD) 888.

Figure 8B:
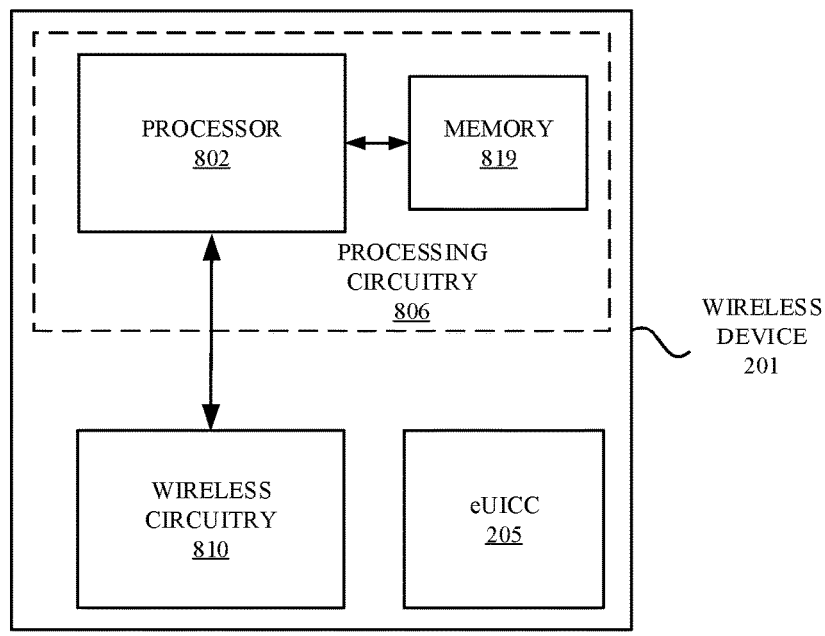
FIG. 8B illustrates exemplary details of the wireless device of FIG. 2B, according to some embodiments.

FIG. 8B illustrates exemplary components of the wireless device 201. The wireless device 201 can include wireless circuitry 810 and processing circuitry 806. The processing circuitry 806 can include one or more processors, here represented as a processor 802. The one or more processors communicate with one or more memories, here represented as a memory 819. In some embodiments, the LPA 210 is executed as logic in processor 802.

Figure 8C:
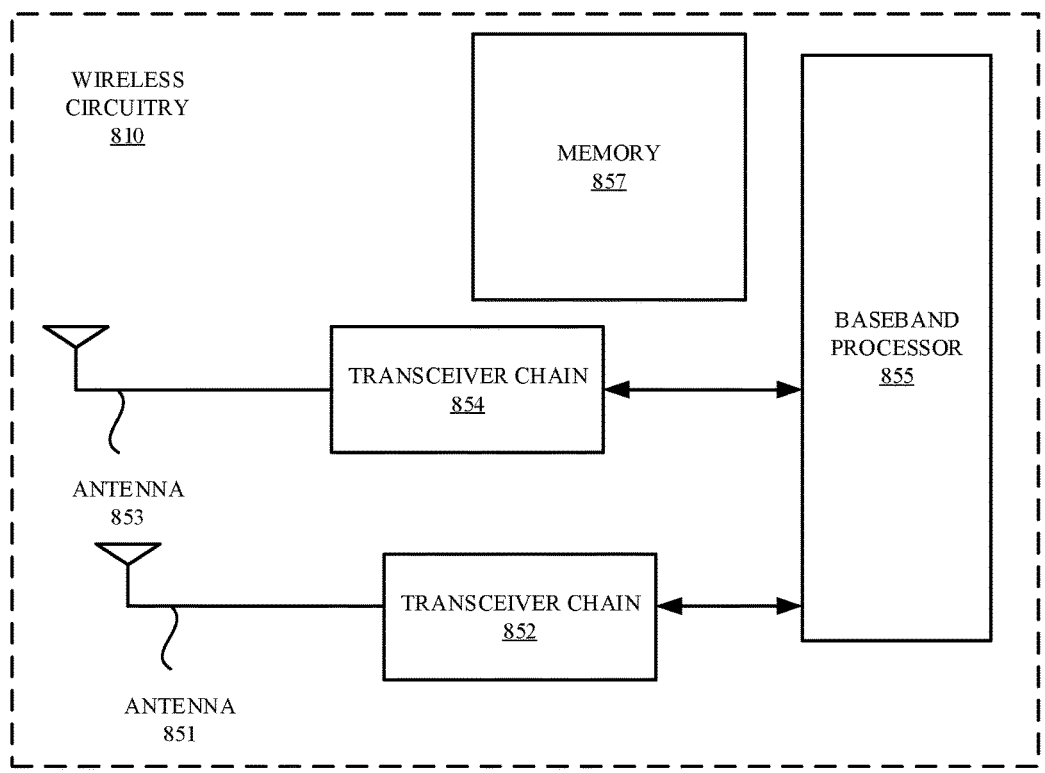
FIG. 8C illustrates exemplary details of wireless circuitry of FIG. 8B, according to some embodiments.

FIG. 8C provides exemplary components of the wireless circuitry 810, according to some embodiments. The wireless circuitry 810 includes antennas 851 and 853 connected to transceiver chains 852 and 854, respectively. The transceiver chains are connected to the baseband processor 855. The wireless circuitry 810 also includes memory 857. In some embodiments, the LPA 210 is executed as logic in the baseband processor 855.

Representative Embodiments

In some embodiments, a method performed by an eUICC 205 includes: (i) receiving a script, where the script includes a first remote profile management (RPM) command and a second RPM command; (ii) scanning the script; (iii) performing the first RPM command; (iv) deferring a communication to an LPA 210 that is external to the eUICC 205, the communication in response to the first RPM command, based on the scanning; (iv) performing the second RPM command; and (v) performing the communication with the LPA 210 subsequent to performing the second RPM command.

In some embodiments, the eUICC 205 receives the script from an electronic subscriber identity module (eSIM) server 220 via the LPA 210. In some embodiments, the first RPM command is a disable profile command directed to a first eSIM 211 on the eUICC 205. In some embodiments, the second RPM command is an enable profile command directed to a second eSIM 212 on the eUICC 205. In some embodiments, the script further includes a third RPM command, where the third RPM command is a delete profile command directed to the first eSIM 211, and the third RPM command occurs in the RPM script after the first RPM command and before the second RPM command. In some embodiments, the method further includes storing state information in the eUICC 205, where the state information indicates a first activation status of the first eSIM 211 and a second activation status of the second eSIM 212. In some embodiments, before the eUICC 205 performs the first RPM command and the second RPM command, the first activation status corresponds to an enabled state and the second activation status corresponds to a disabled state. In some embodiments, subsequent to the eUICC 205 performing the first RPM command and before the eUICC 205 performs the second RPM command, the first activation status and the second activation status both correspond to a disabled state. In some embodiments, after the eUICC 205 performs both the first RPM command and the second RPM command, the first activation status corresponds to a disabled state and the second activation status corresponds to an enabled state. In some embodiments, performing the communication with the LPA 210 includes the eUICC 205 sending a refresh command to the LPA 210. In some embodiments, the method further includes the eUICC 205: receiving, from the LPA 210, a memory read command; and sending, to the LPA 210, profile status information that indicates the first eSIM 211 is disabled, and that the second eSIM 212 is enabled. In some embodiments, the memory read command is sent by the LPA 210 in response to the refresh command. In some embodiments, after receiving the memory read command and before sending the profile status information, the eUICC 205 obtains the profile status information from state information stored in the eUICC 205.

In some embodiments, an eUICC 205 configurable for operation in a wireless device 201 includes a processor and a memory storing instructions that, when executed on the processor, cause the eUICC 205 to perform actions that include: (i) receiving a script that includes: (a) a script processing command, (b) a first remote profile management (RPM) command, and (c) a second RPM command; (ii) determining that the script processing command is a hold command; (iii) performing the first RPM command; (iv) deferring, based on the hold command, a communication to an LPA 210 that is external to the eUICC 205, the communication based on the first RPM command; (v) performing the second RPM command; and (vi) performing the communication with the LPA 210 subsequent to the second RPM command.

In some embodiments, the script is received by the eUICC 205 from an eSIM server 220 via the LPA 210. In some embodiments, the first RPM command is a disable profile command directed to a first eSIM 211. In some embodiments, the second RPM command is an enable profile command directed to a second eSIM 212. In some embodiments, the actions performed by the eUICC 205 further include: (vi) receiving, from the LPA 210, a memory read command, where performing the communication with the LPA 210 includes sending a refresh command; (vii) sending, to the LPA 210, profile status information that indicates the first eSIM 211 is disabled and the second eSIM 212 is enabled. In some embodiments, the script includes a third RPM command; the third RPM command is a delete profile command directed to a first eSIM 211 on the eUICC 205; and the third RPM command occurs in the script after the first RPM command and before the second RPM command. In some embodiments, the actions performed by the eUICC 205 further include: (viii) receiving from the LPA 210 a memory read command, where the performing the communication with the LPA 210 includes sending a refresh command; and (ix) sending, to the LPA 210, profile status information, where the profile status information indicates that the second eSIM 212 is enabled.

In some embodiments, a wireless device includes (i) one or more antennas; (ii) an applications processor and a storage medium storing instructions for an LPA 210; and (iii) an eUICC 205 includes a processor and a memory storing instructions that, when executed by the processor, cause the eUICC 205 to perform actions that includes: (a) receiving, while executing a card application toolkit (CAT) session with the LPA 210, a profile management command, where the profile management command is a remote profile management (RPM) command or local profile management (LPM) command; (b) terminating the CAT session; (c) receiving, from the LPA 210, a message related to the CAT session; and (d) processing the profile management command while ignoring the message related to the CAT session from the LPA 210. In some embodiments, the eUICC 205 terminates the CAT session by closing a logical channel associated with the CAT session and/or by releasing a portion of cache memory associated with the CAT session.

In some embodiments, a method performed by an eUICC 205 of a wireless device 201 includes: (i) receiving, while executing a card application toolkit (CAT) session with an LPA 210, a local profile management (LPM) command from a user of the wireless device 201; (ii) terminating the CAT session by at least closing a logical channel associated with the CAT session; (iii) receiving a message from the LPA 210 related to the CAT session; and (iv) processing the LPM command while ignoring the message from the LPA 210.

In some embodiments, a method performed by an eUICC 205 of a wireless device 201 includes: (i) receiving a script, wherein the script includes a first remote profile management (RPM) command and a second RPM command; (ii) scanning the script; (iii) performing the first RPM command; (iv) sending a first refresh command to an LPA 210 based on a presence in the script of an explicit command code linked to the first RPM command; (v) performing the second RPM command; and (vi) sending a second refresh command to the LPA based on the second RPM command.

In some embodiments, a method performed by an eSIM server 220 includes: (i) forming a remote profile management (RPM) script including a command to hold a refresh command; and (ii) sending the RPM script to an eUICC 205 of a wireless device 201. In some embodiments, the RPM script includes: (a) a hold refresh command, (b) a first disable profile command directed to a first eSIM 211, (c) a delete profile command directed to the first eSIM 211, and (d) an enable profile command directed to a second eSIM 212.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 9:
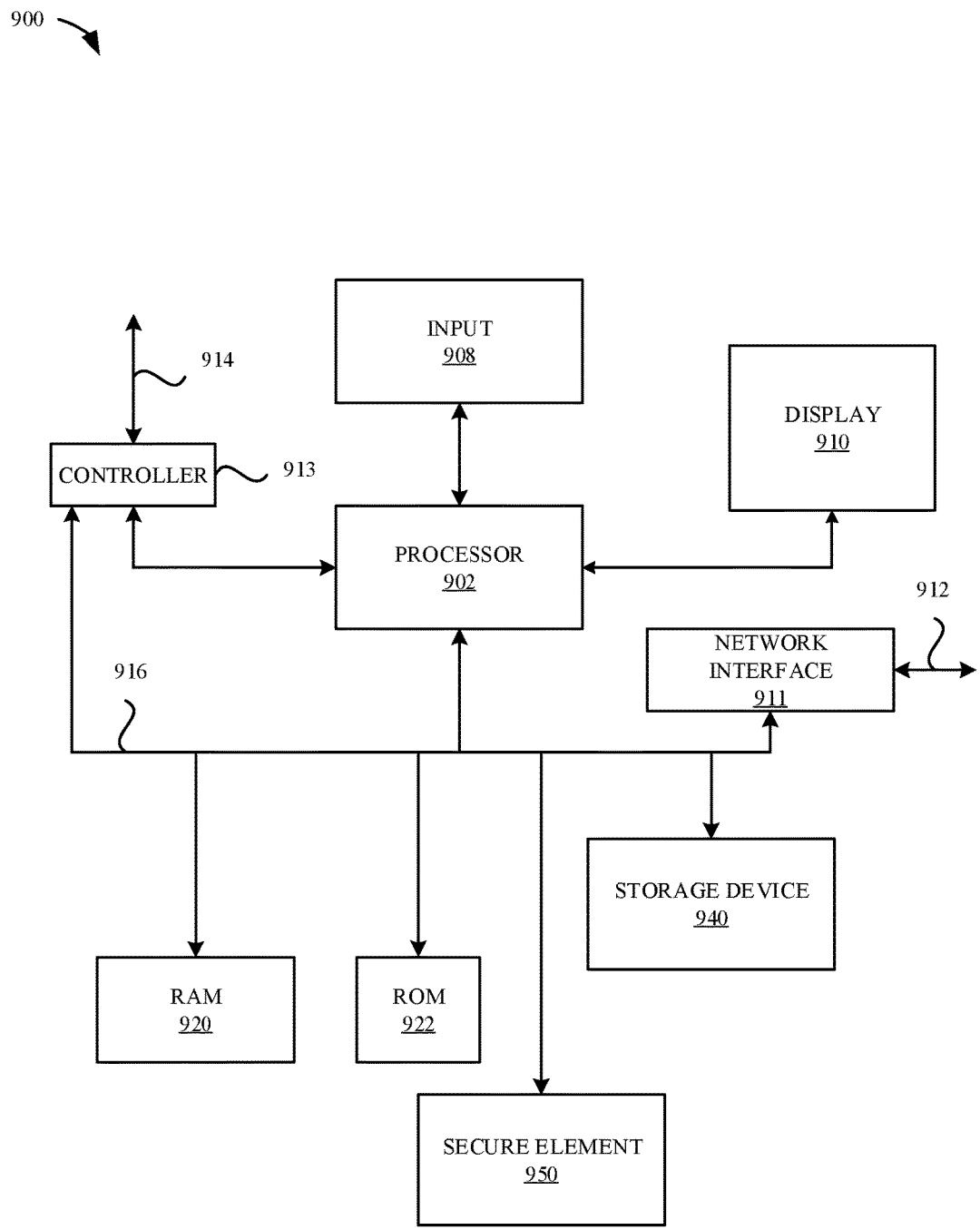
FIG. 9 illustrates an exemplary apparatus for implementation of the embodiments disclosed herein, according to some embodiments.

FIG. 9 illustrates in block diagram format an exemplary computing device 900 that can be used to implement the various components and techniques described herein, according to some embodiments. In particular, the detailed view of the exemplary computing device 900 illustrates various components that can be included in the eSIM server 220, the wireless device 201, and the eUICC 205 illustrated in one or more of FIGS. 2B, 7, 8A, 8B, and 8C. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 (screen display) that can be controlled by the processor 902 to display information to the user (for example, information relating to incoming, outgoing, or active communication session). A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that couples to a data link 912. In the case of a wireless connection, the network/bus interface 911 can include wireless circuitry, such as a wireless transceiver and/or baseband processor.

The computing device 900 also includes the storage device 940, which can comprise a single storage or a plurality of storages (e.g., hard drives), and includes a storage management module that manages one or more partitions within the storage device 940. In some embodiments, storage device 940 can include flash memory, semiconductor (solid state) memory or the like. The computing device 900 can also include a Random Access Memory ("RAM") 920 and a Read-Only Memory ("ROM") 922. The ROM 922 can store programs, utilities or processes to be executed in a non-volatile manner. The RAM 920 can provide volatile data storage, and stores instructions related to the operation of the computing device 900. The computing device 900 also includes a secure element 950. In some embodiments, the secure element 950 is an eUICC 205.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
   at an embedded universal integrated circuit card (eUICC):
      receiving a script that includes:
         a first remote profile management (RPM) command, and
         a second RPM command;
      scanning the script;
      performing the first RPM command;
      deferring, based on the scanning, a communication to a local profile assistant (LPA) that is external to the eUICC, the communication in response to the first RPM command;
      performing the second RPM command;
      sending a refresh command to the LPA subsequent to performing the second RPM command;
      receiving, from the LPA responsive to the refresh command, a memory read command; and
      sending, to the LPA responsive to the memory read command, profile status information for one or more electronic subscriber identity modules (eSIMs) on the eUICC.

2. The method of claim 1, wherein the eUICC receives the script from an electronic subscriber identity module (eSIM) server via the LPA.

3. The method of claim 1, wherein the first RPM command is a disable profile command directed to a first eSIM on the eUICC.

4. The method of claim 3, wherein the second RPM command is an enable profile command directed to a second eSIM on the eUICC.

5. The method of claim 4, wherein:
   the script further includes a third RPM command,
   the third RPM command is a delete profile command directed to the first eSIM, and
   the third RPM command occurs in the RPM script after the first RPM command and before the second RPM command.

6. The method of claim 4, wherein the method further comprises:
   storing state information in the eUICC, wherein the state information indicates a first activation status of the first eSIM and a second activation status of the second eSIM.

7. The method of claim 6, wherein, before the performing the first RPM command, the first activation status of the first eSIM corresponds to an enabled state and the second activation status of the second eSIM corresponds to a disabled state.

8. The method of claim 6, wherein, subsequent to the performing the first RPM command and before the performing the second RPM command, the first activation status of the first eSIM and the second activation status of the second eSIM each correspond to a disabled state.

9. The method of claim 6, wherein, subsequent to the performing the second RPM command, the first activation status of the first eSIM corresponds to a disabled state and the second activation status of the second eSIM corresponds to an enabled state.

10. The method of claim 1, wherein the profile status information for the one or more eSIMs on the eUICC indicates:
    a first eSIM is disabled, and
    a second eSIM is enabled.

11. The method of claim 10, further comprising:
    after receiving the memory read command and before sending the profile status information:
       obtaining the profile status information from state information stored in the eUICC.

12. An embedded universal integrated circuit card (eUICC) configurable for operation in a wireless device, the eUICC comprising a processor and a memory storing instructions that, when executed on the processor, cause the eUICC to perform actions that include:
    receiving a script that includes:
       a first remote profile management (RPM) command, and
       a second RPM command;
    scanning the script;
    performing the first RPM command;
    deferring, based on the scanning, a communication to a local profile assistant (LPA) that is external to the eUICC, the communication in response to the first RPM command;
    performing the second RPM command;
    sending a refresh command to the LPA subsequent to the second RPM command;
    receiving, from the LPA responsive to the refresh command, a memory read command; and
    sending, to the LPA responsive to the memory read command, profile status information for one or more electronic subscriber identity modules (eSIMs) on the eUICC.

13. The eUICC of claim 12, wherein:
    the first RPM command is a disable profile command directed to a first eSIM on the eUICC, and
    the second RPM command is an enable profile command directed to a second eSIM on the eUICC.

14. The eUICC of claim 12, wherein the profile status information for the one or more eSIMs on the eUICC indicates:
    a first eSIM is disabled, and
    a second eSIM is enabled.

15. The eUICC of claim 12, wherein:
    the script includes a third RPM command, the third RPM command is a delete profile command directed to a first eSIM on the eUICC, and the third RPM command occurs in the script after the first RPM command and before the second RPM command.

16. The eUICC of claim 15, wherein the profile status information indicates that a second eSIM is enabled.

17. A wireless device comprising:
one or more antennas;
an applications processor and a storage medium storing instructions for a local profile assistant (LPA); and
an embedded universal integrated circuit card (eUICC) comprising a processor and a memory storing instructions that, when executed by the processor, cause the eUICC to perform actions that include:
  receiving a script that includes:
    a first remote profile management (RPM) command, and
    a second RPM command;
  scanning the script;
  performing the first RPM command;
  deferring, based on the scanning, a communication to a local profile assistant (LPA) that is external to the eUICC, the communication in response to the first RPM command;
  performing the second RPM command;
  sending a refresh command to the LPA subsequent to performing the second RPM command;
  receiving, from the LPA responsive to the refresh command, a memory read command; and
  sending, to the LPA responsive to the memory read command, profile status information for one or more electronic subscriber identity modules (eSIMs) on the eUICC.

18. The method of claim 1, wherein:
the script includes a hold command,
the scanning the script identifies the hold command; and
the deferring, based on the scanning, is based on the inclusion of the hold command in the script.

19. The eUICC of claim 12, wherein:
the script includes a hold command,
the scanning the script identifies the hold command; and
the deferring, based on the scanning, is based on the inclusion of the hold command in the script.

20. The wireless device of claim 17, wherein:
the script includes a hold command,
the scanning the script identifies the hold command; and
the deferring, based on the scanning, is based on the inclusion of the hold command in the script.

* * * * *